Sept. 18, 1962
G. W. SPENCER II
3,054,909
AUTOMATIC REFERENCE SWITCHING CIRCUIT
Filed Dec. 31, 1958
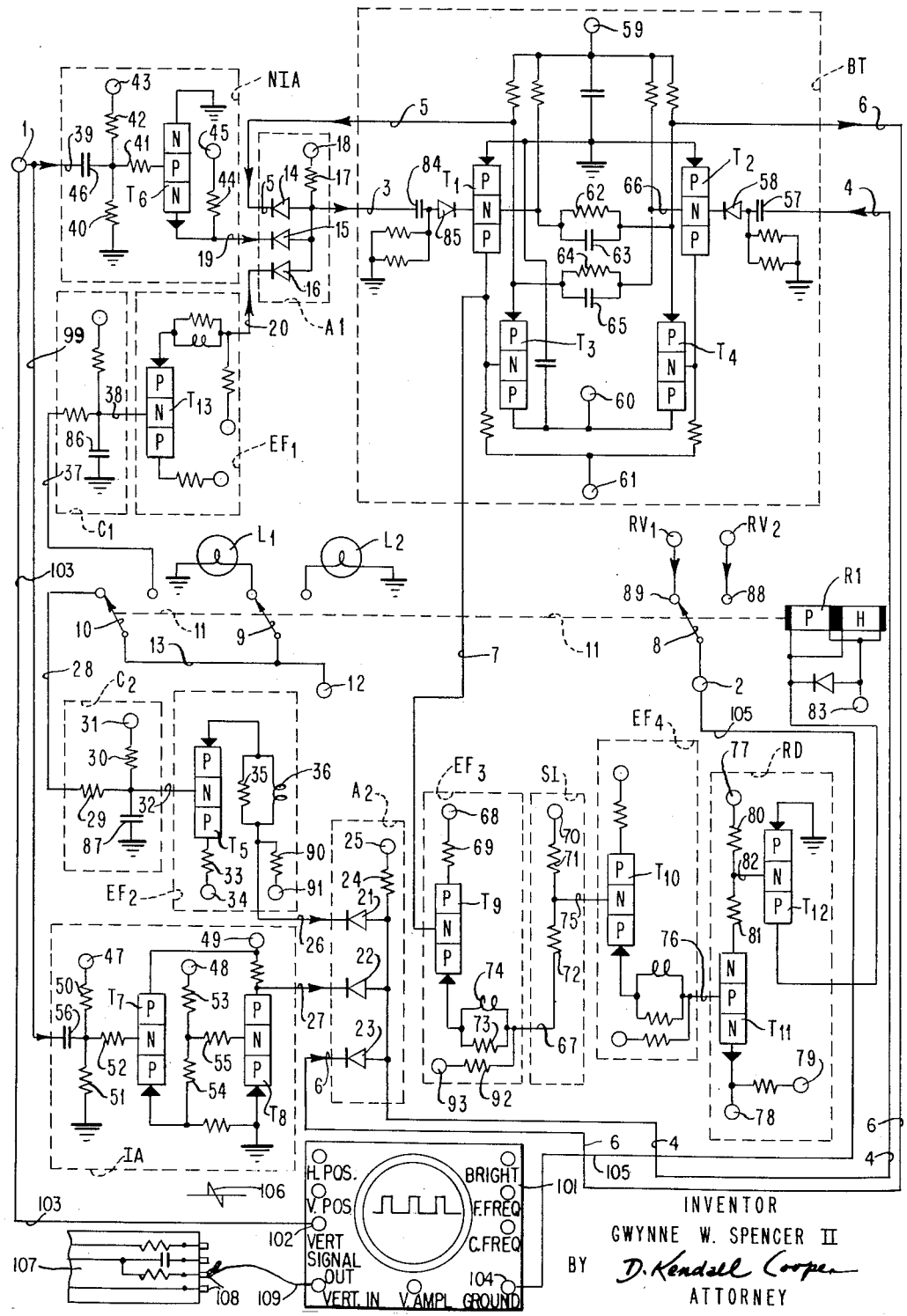
INVENTOR
GWYNNE W. SPENCER II
BY D. Kendall Cooper
ATTORNEY

United States Patent Office 3,054,909
Patented Sept. 18, 1962

3,054,909
AUTOMATIC REFERENCE SWITCHING CIRCUIT
Gwynne W. Spencer II, Poughkeepsie, N.Y., assignor to International Business Machines Corporation, New York, N.Y., a corporation of New York
Filed Dec. 31, 1958, Ser. No. 784,357
6 Claims. (Cl. 307—88.5)

This invention relates in general to electronic switching circuits, and more particularly, to an automatically responsive reference switching circuit which has particular utility in transistor circuit testing applications.

Transistors have found widespread use in practically every type of electronic equipment, including high speed computers. Increased speed of response and improved reliability have been achieved in certain computer applications by utilizing transistor current switching circuits like those described in the paper entitled: "Millimicrosecond Transistor Current Switching Techniques," presented by H. S. Yourke and E. J. Slobodzinski at the Western Joint Computer Conference, February 26–28, 1957, Los Angeles, California or like those described in application Ser. No. 622,307, filed November 15, 1956, entitled "Transistor Switching Circuits," inventor: H. S. Yourke, same assignee as this application.

In general, these circuits provide increased speed by avoiding operation of the transistors at or near saturation, which minimizes delays in response. Further improvement in response is provided by employing small voltage swings for control purposes, thus avoiding development of excess voltages. In certain of these circuits the collector diodes are reverse biased by approximately six volts to avoid saturation and to avoid delay in cut off due to carrier storage.

As a result of the aforementioned bias, the output voltage from a particular transistor usually differs from the input voltage by six volts and consequently two reference levels exist in the circuits about which the signals swing.

If the two reference levels are −6.0 volts and ground, for example, a problem is encountered during circuit testing when it is desired to observe the signals in a particular circuit on an oscilloscope. It may be assumed, for purposes of illustration, that the small voltage swings encountered may be .5 volt to 1.0 volt about each of the two reference levels. It is desirable when using an oscilloscope during testing to sufficiently magnify these signals so that they will appear large on the oscilloscope screen and thus provide a more accurate indication of the shape and magnitude of the observed signal.

If the oscilloscope ground input is at one reference level and if the vertical sensitivity on the oscilloscope is adjusted to .5 volt per centimeter, for example, so that an observed signal which swings about that reference level is magnified for accurate observation on the oscilloscope face, and if a signal which swings about the other reference level is applied to the oscilloscope for observation, the oscilloscope trace may disappear completely off the face of the screen because of the difference between the two reference levels. In the assumed case, there is a difference of 6.0 volts between the two reference levels, so a sensitivity of .5 volt per centimeter would result in a vertical shift of the scope trace of 12 centimeters on the oscilloscope face, or approximately 4.7 inches.

If the oscilloscope has a 5″ screen, and if the vertical positioning control is adjusted so that signals swinging about one reference level are properly positioned for observation on the oscilloscope face, a deflection of 4.7 inches resulting from a change in reference levels would cause a complete disappearance of the trace from the screen.

This situation may be corrected manually by the person using the oscilloscope each time the reference level changes but if signal waveforms are being observed in circuits wherein changes from one reference level to another occur frequently during test operations, the manual adjustment required each time a change occurs would prove to be extremely time consuming and inefficient.

The present invention overcomes this difficulty in a novel and efficient manner by insuring that a particular reference voltage is rapidly and automatically applied to the oscilloscope "ground" terminal whenever that reference voltage is encountered during testing so that an observed signal waveform based on that reference voltage will be properly positioned on the oscilloscope face and so that desired sensitivity may be maintained for accurate observation and analysis.

The circuit contemplated by the present invention includes first means which discriminate among and respond to signals applied to the circuit, storage means which are conditioned by said first means to represent the type of signal applied and switching means responsive to the condition of the storage means for providing a particular reference potential to the output of the circuit.

Accordingly, an object of the invention is to provide a switching circuit which will discriminate among and respond to signals applied to the circuit and which will automatically provide a particular reference potential according to the type of signal applied.

Another object of the invention is to provide a switching circuit to which signals of unlike polarity may be applied, and which will automatically provide a particular reference potential according to the polarity of the applied signal.

Still another object of the invention is to provide a switching circuit which will respond to a first applied signal to automatically provide a particular reference potential and which will not respond to any subsequently received signals until after a predetermined interval of time.

Still another object of the invention is to provide an automatic reference switching circuit which will switch to and remain in a particular condition until a signal having a particular polarity is applied thereto.

A further object of the invention is to provide an automatic reference switching circuit which will change its reference condition only upon application of a signal having a particular magnitude.

A still further object of the invention is to provide a switching circuit which rapidly provides a particular reference potential in response to an applied signal and which is more efficient and reliable in operation.

Another object of the invention is to provide a switching circuit which will automatically provide a particular reference potential to an oscilloscope in response to a signal from the oscilloscope which indicates that a change to that reference level has been encountered in a circuit under test.

An additional object of the invention is to provide a switching circuit which will automatically provide a particular reference potential to an oscilloscope in response to a first signal from said oscilloscope indicative of a change to that reference level and which will not respond to any subsequently arriving signals from said oscilloscope until after a predetermined interval of time.

Other objects of the invention will be pointed out in the following description and claims and illustrated in the accompanying drawing, which disclose, by way of example, the principle of the invention and the best mode which has been contemplated of applying that principle.

In the drawing:

The single FIGURE is a detailed circuit diagram of the preferred embodiment of the invention and also depicts the various circuit stages in block form.

DESCRIPTION

In the drawing, the switching circuit of the invention is shown in use with an oscilloscope 101, which is represented in a simplified form. The oscilloscope 101 could be any of several well known types which are used in laboratories or research centers. Oscilloscopes of this nature have a number of controls and terminals or signal hubs for establishing a desired waveform display.

Only a few typical controls and terminals are shown in the drawing. These are listed below with their abbreviations.

| Terminal or Control: | Abbreviation |
|---|---|
| Vertical Input | Vert. In. |
| Vertical Signal Output | Vert. Signal Out. |
| Vertical Amplitude | V. Ampl. |
| Ground | Ground |
| Horizontal Positioning | H. Pos. |
| Vertical Positioning | V. Pos. |
| Brightness | Bright. |
| Coarse Frequency | C. Freq. |
| Fine Frequency | F. Freq. |

The Controls provide functions which are well known in the art at this time. The terminals with which this invention is concerned accept or provide signals which are explained below in the description.

A thorough exposition of oscilloscopes, such as oscilloscope 101, is presented in "Encyclopedia on Cathode-Ray Oscilloscopes and Their Uses" by John F. Rider and Seymour D. Uslan, published by John F. Rider Publisher, Inc.

It will be assumed that oscilloscope 101 is in use, and that it has a "Vertical Signal Output" hub 102 which provides an A.-C. voltage, the amplitude of which depends on the magnitude of an observed signal applied to the oscilloscope input terminal during testing. Thus, for example, it might be assumed that a signal with a range of two volts peak to peak is available at the "Vertical Signal Output" hub 102 for any observed signal which causes a one centimeter deflection on the oscilloscope face.

In the particular application described herein, signals from the "Vertical Signal Output" hub of the oscilloscope will be applied to the input terminal 1 of the switching circuit by way of line 103. The switching circuit will provide a "ground" reference potential $RV_1$ to the oscilloscope "ground" hub 104 by way of line 105 when a positive shifting signal with sufficient amplitude is received from the oscilloscope and the switching circuit will provide a $-6.0$ volt reference potential $RV_2$ to the oscilloscope "ground" hub 104 when a negative shifting signal with sufficient amplitude is received from the oscilloscope.

For purposes of this description, it will be assumed that a first differentiated signal of approximately twelve volts in the positive direction will be available at the "Vertical Signal Output" hub 102 whenever a shift in reference levels occurs in the positive direction, that is, from a $-6.0$ volt reference level to a ground reference level, and it will be further assumed that a first differentiated signal of approximately twelve volts in the negative direction will be available at the "Vertical Signal Output" hub 102 whenever a shift in reference levels occurs in the negative direction, that is, from a ground reference level to a $-6.0$ volt reference level. A second differentiated spurious or undesired signal of opposite polarity also occurs in each of the above cases when the oscilloscope is provided with an A.-C. vertical signal output as was assumed. The switching circuit of the present invention is especially advantageous when used with an oscilloscope of this type, in that the circuit will respond to the first signal but not to the second undesired signal as will be pointed out in the description.

Referring to the drawing, it may be assumed that both positive shifting and negative shifting signals from the "Vertical Signal Output" hub of the oscilloscope such as those represented by waveform 106, are applied to terminal 1 over line 103. As a result, a change in the status of the switching circuit may occur, depending on the previous condition of the circuit and the type of signal applied. The circuit will provide either one of two reference voltages at output terminal 2 which may then be applied to the "ground" hub of the oscilloscope through a wire 105 which is connected to terminal 2.

It will be apparent that the invention may be used in applications other than those involving oscilloscope testing. The invention may be employed in various applications wherein it is desired to have a particular reference voltage available whenever a particular signal occurs. The signal applied to the input of the switching circuit of the present invention thus may be provided by one device and the reference voltage may be made available by the switching circuit to a completely separate and independent device.

The switching circuit includes a bistable trigger BT which may assume an ON state or an OFF state, as is well known in the art. Positive shifting signals from oscilloscope 101 are applied to trigger BT through a first channel which comprises a non inverting amplifier NIA, and through an AND circuit $A_1$ via line 3 to cause the trigger BT to assume its ON state. This channel will be referred to as the "Transfer to $RV_1$" channel or "Transfer to Ground" channel since the application of a positive shifting signal to the terminal 1 will cause an output voltage of ground potential to be available from the switching circuit at terminal 2.

Negative shifting signals from the oscilloscope which arrive at input terminal 1 are first inverted to positive signals in a second channel which comprises inverting amplifier IA, and are then directed through an AND circuit $A_2$ via line 4 to cause the trigger BT to assume its OFF state. This channel will be referred to as the "Transfer to $RV_2$" channel or "Transfer to $-6.0$ volt" channel since the application of a negative shifting signal to terminal 1 will cause an output potential of $-6.0$ volts to be available from the switching circuit at terminal 2.

Three output lines are provided from the trigger BT. Output line 5 is directed to one input of AND circuit $A_1$ and output line 6 is directed to one input of AND circuit $A_2$. The voltage existing on a third output line 7 controls the energization of a relay $R_1$ through an emitter follower stage $EF_3$, a special input network SI, an emitter follower stage $EF_4$, and a relay driver stage RD.

The bistable trigger BT is comprised of four P-N-P transistors: $T_1$ and $T_3$ which are related, and $T_2$ and $T_4$ which are related; associated biasing and coupling resistors and coupling capacitors and several voltage sources. Trigger BT is considered to be in its ON state when transistor $T_2$ is conducting since a more positive potential is available on output line 6, and trigger BT is considered to be in its OFF state when transistor $T_1$ is conducting, since a more positive potential is available on output line 5.

The trigger BT is caused to assume its ON condition by the application of a ground potential to transistor $T_1$ via line 3 which is provided under proper conditions from AND circuit $A_1$. The trigger BT is caused to assume its OFF condition by the application of a ground potential to transistor $T_2$ via line 4 which is similarly provided under proper conditions from AND circuit $A_2$.

Approximate voltage outputs on line 5, 6 and 7 in the embodiment shown for the two states of the trigger BT may be summarized as follows:

| | Trigger BT ON (Transistor $T_2$ conducting) | Trigger BT OFF (Transistor $T_1$ conducting) |
|---|---|---|
| Output Line 5 | $-6.0$ | Ground. |
| Output Line 6 | Ground | $-6.0$. |
| Output Line 7 | $-6.0$ | Ground. |

It is evident that the output line 7 provides the same voltage output in each case as that which is available on output line 5.

Relay $R_1$ becomes energized because of the voltage applied from trigger BT on line 7 when trigger BT is in its OFF state, that is, when transistor $T_1$ is conducting, and relay $R_1$ becomes deenergized because of the voltage applied from trigger BT on line 7 when trigger BT is in its ON state, that is, when transistor $T_2$ is conducting. Relay $R_1$ controls the simultaneous switching of three relay points 8, 9 and 10 as indicated by the dashed line 11. As depicted, Relay $R_1$ is in its deenergized state and the relay points 8, 9, and 10 are all in their normally closed positions.

Relay point 8 directs the "ground" level reference voltage $RV_1$ to terminal 2 when it is in its normally closed position and conversely, relay point 8 directs the "−6.0" volt reference voltage $RV_2$ to terminal 2 when it is in its normally open position. A light $L_1$ is provided to indicate that reference voltage $RV_1$ is available at terminal 2 and a light $L_2$ is provided to indicate that reference voltage $RV_2$ is available at terminal 2. A voltage from terminal 12 is directed through relay point 9 to one of the lights when the reference voltage corresponding to that light is available.

When in its normally closed position, relay point 10 controls the conditioning of one input of AND circuit $A_2$ and in addition, when it is in its normally open position, relay point 10 controls the conditioning of one input of AND circuit $A_1$. The functions of AND circuits $A_1$ and $A_2$ will be described in greater detail shortly.

Voltage potentials applied internally in the switching embodiment among the various circuit stages for controlling the status of the circuit, generally assume either a more positive "ground" level which may be referred to as the "up" level or a more negative −6.0 volt level which may be referred to as the "down" level. These voltage levels would also be present, in a typical case, in circuits under test such as those represented diagrammatically by a circuit card 107 in the drawing. The card 107 has test points or terminals 108 to which an oscilloscope test probe 109 can be attached for observation of circuit signals.

For example, both the output line 3 of AND circuit $A_1$, and the output line 4 of AND circuit $A_2$ assume either a ground or a −6.0 level depending on the input signal conditions and the status of the circuit.

The configurations of AND circuits $A_1$ and $A_2$ are well known in the art. AND circuit $A_1$ which is in the "Transfer to ground" channel is comprised of three diodes 14, 15 and 16, and a resistor 17 which is connected to a +6.0 voltage source at terminal 18. The output line 3 of $A_1$ will assume the most negative voltage applied on input lines 5, 19 and 20 to diodes 14, 15 and 16 respectively. Thus, the output of $A_1$ will remain at about −6.0 volts if any input line is at −6.0 volts and conversely, the output of $A_1$ will rise to approximately a ground potential only when all input lines are at a ground potential.

The foregoing also applies to AND circuit $A_2$ which is comprised of three input diodes 21, 22 and 23, and a resistor 24 which is connected to a +6.0 volt source at terminal 25. AND circuit $A_2$ which is in the "Transfer to −6.0 volt" channel will provide an approximately ground potential on output line 4 only when the potential applied on all input lines 6, 26 and 27 are at ground potential.

TYPICAL OPERATION—INITIAL STATUS—$RV_1$

In order to describe a typical operation of the switching circuit, it will first be assumed that the circuit is in the status depicted in the drawing. In this particular status, the trigger BT is ON, that is transistor $T_2$ is conducting, relay $R_1$ is in a deenergized condition, and relay points 8, 9 and 10 are in their normally closed positions.

With trigger BT ON, the trigger output lines 5 and 7 are at approximately −6.0 volts and the trigger output line 6 is approximately at ground potential. The ground potential from the trigger BT on line 6 is applied to the input diode 23 of AND circuit $A_2$.

A second input 26 of $A_2$ is also at ground potential because of the following conditions. A +6.0 volt potential is available at terminal 12 and with relay $R_1$ deenergized, relay point 10 directs this voltage to the input of a coupling network $C_2$ on line 28. The coupling network $C_2$ comprises an input resistor 29, a second resistor 30 which has a resistance equal to resistor 29 and which is connected to a −6.0 volt source at terminal 31. The output of coupling network $C_2$ is directed on line 32 to a transistor $T_5$ which is in an emitter follower stage $EF_2$. This stage, $EF_2$ in addition to $T_5$, comprises a resistor 33 which is connected to a −12.0 volt source at terminal 34 and, a resistor 35 and an inductance 36 arranged in parallel in the output line 26 which is directed to diode 21 of AND circuit $A_2$. A load resistor 90 which is connected to a +6.0 volt potential at terminal 91, is also provided for $T_5$.

When there is no input potential applied on line 28 to coupling network $C_2$, the output of $C_2$ will tend to be a −6.0 volts, and this is applied to the base of transistor $T_5$. Since $T_5$ is connected as an emitter follower, the output of $EF_2$ on line 26 will also tend to be a −6.0 volts.

However, in the assumed state of the circuit, since a +6.0 volts is being applied to the input of $C_2$ and since resistors 29 and 30 are of equal value the output of $C_2$ will tend to be at ground potential due to the voltage dividing action of resistors 29 and 30. The output of $EF_2$ will follow the input on line 32 and will change to a ground potential.

Thus, the input of AND circuit $A_2$ on line 26 to diode 21 will be at a ground potential under the initial conditions previously assumed.

Since input lines 26 and 6 of $A_2$ are up at this time, it is only necessary to apply a ground potential to the third input diode 22 via line 27 from the inverting amplifier IA to cause the output of $A_2$ on line 4 to go from about −6 to ground for application to the trigger BT.

The condition of AND circuit $A_1$ should be considered at this time. Since trigger BT is ON, a −6.0 volt potential on line 5 will be applied to input diode 14 of AND circuit $A_1$. Another input of $A_1$ on line 20 to diode 16 is derived from a coupling network $C_1$ and an emitter follower stage $EF_1$ which have identical configurations to $C_2$ and $EF_2$, respectively, just discussed. No input is being provided at this time by relay point 10 to the input of coupling network $C_1$ via line 37, so the output of $C_1$ via line 38 will tend to be a −6.0 volts. The output of $EF_1$, will follow the input as was the case with $EF_2$ and so a −6.0 volt potential will exist on line 20 to the input diode 16 of AND circuit $A_1$. Since two input lines of $A_1$ are down, no change in the output of $A_1$ on line 3 would occur should a ground potential be applied to the input diode 15 via line 19 from the non inverting amplifier NIA.

With relay $R_1$ deenergized, reference voltage $RV_1$ (ground) is being applied to the oscilloscope ground hub 104 from terminal 2 through relay point 8. As long as the reference level in the circuits under test also remain at a ground potential as the oscilloscope probe is touched from one test point to another, no change will occur in the status of the switching circuit, since no signals will be provided from the oscilloscope to input terminal 1 to affect the switching circuit. Thus, all observed voltages which swing about the ground reference level will be properly displayed on the oscilloscope.

TYPICAL OPERATION—TRANSFER FROM $RV_1$ TO $RV_2$

It may now be assumed that the oscilloscope probe is applied to a test point to observe a voltage that swings around the other reference level, that is, −6.0 volts. It is now necessary to provide the −6.0 volt $RV_2$ potential from output terminal 2 to the oscilloscope "ground" hub 104 so that the observed voltage may be properly positioned on the oscilloscope face. With the switching circuit in its ground status as was previously assumed the transfer to −6.0 volts is accomplished in the following manner.

As a result of the change in reference level from ground to −6.0 volts being encountered by the oscilloscope probe, a negative shifting signal of about −12.0 volts will be applied to input terminal 1 of the switching circuit from the oscilloscope "Vertical Signal Output" hub 102. The signal is applied simultaneously to the non-inverting amplifier stage NIA and to the inverting amplifier stage IA via lines 39 and 99, respectively.

Because of the biasing potentials provided in the NIA stage, an applied signal must have a magnitude of at least +10.0 volts in order to affect the stage so that it will provide an output to AND circuit $A_1$, and similarly, because of the biasing potentials provided in the IA stage, an applied signal must have a magnitude of at least −10.0 volts to affect that stage so that it will provide an output to AND circuit $A_2$. This is to insure that spurious signals encountered during testing will not affect the switching circuit and that switching will occur only when an actual change in reference levels takes place.

The NIA stage comprises a transistor $T_6$ with associated input resistors 40 and 41 and a resistor 42 which is connected to a −36.0 volt source at terminal 43. Another resistor 44 on the output side of $T_6$ is connected to a −6.0 volt source at terminal 45. Under no signal conditions, the input to the base of transistor $T_6$ will be about 6.0 volts more negative than the emitter of $T_6$ due to the dividing action of resistor 40 and 42 and the bias voltage provided to the emitter of $T_6$ through resistor 44.

The output on line 19 will tend to be about −6.0 volts. The assumed −12.0 volt signal from the oscilloscope 101 applied through capacitor 46 will have little effect on transistor $T_6$ and the output on line 19 to the input diode 15 of $A_1$ will remain at the −6.0 volt "down" level. Thus, no change occurs in the output of the non inverting amplifier NIA as a result of the arrival of the −12.0 volt signal at terminal 1.

The inverting stage IA comprises an emitter follower coupled transistor $T_7$, an inverter coupled transistor $T_8$, and various associated biasing resistors, coupling resistors and voltage sources. A potential of +36.0 volts is provided at terminal 47, a potential of +6.0 volts is provided at terminal 48 and a potential of −6.0 volts is provided at terminal 49 in the IA stage. Under no signal conditions, transistor $T_7$ and transistor $T_8$ are normally biased off. The base of transistor $T_7$ would have approximately +12.0 volts on it as a result of the dividing action of input resistors 50 and 51 and the base of transistor $T_7$ will be slightly more negative than the ground potential applied to its emitter due to the voltage dividing action of resistors 53 and 54.

The −12.0 volt signal shift from the oscilloscope 101, applied through capacitor 56 to transistor $T_7$ will substantially affect the normal off bias of transistor $T_7$ so that the base of $T_7$ will move toward −6.0 volts from the off bias of +12.0 volts. As a result the base to emitter junction of $T_7$ is forward biased and $T_7$ conducts. The $T_7$ emitter tends to follow the input signal to a more negative level and this results in a negative shift being applied to the base of transistor $T_8$. The $T_8$ base to emitter junction is then forward biased and $T_8$ conducts. The collector of $T_8$ tends to move away from the −6.0 volt bias potential applied from terminal 49 to a more positive level, that is about ground.

It will be recalled that under the initial assumed conditions, a ground potential was being applied from $C_2$ and $EF_2$ to input diode 21 of AND circuit $A_2$ and that a ground potential was being applied from the trigger BT output line 6 to input diode 23 of AND circuit $A_2$.

As a result of transistor $T_7$ and $T_8$ going into conduction and the change to ground potential on line 27 to input diode 22, all three inputs of $A_2$ will now be at ground potential. The output of $A_2$ on line 4 will then rise to ground.

The change to ground potential which occurs on the output line 4 of AND circuit $A_2$ is directed to the base of transistor $T_2$ in the trigger BT through a capacitor 57 and a diode 58. In the bistable trigger stage shown, a voltage source of +6.0 is provided at terminal 59, a voltage source of −12.0 is provided at terminal 60 and a voltage source of −6.0 is provided at terminal 61.

In order to provide sufficient power output, a transistor $T_3$ is provided which operates in response to the condition of transistor $T_1$, and a transistor $T_4$ is provided which operates in response to the condition of transistor $T_2$. A cross coupling network comprising a resistor 62 and a capacitor 63 connects the emitter of transistor $T_4$ to the base of transistor $T_1$ and a second cross coupling network comprising a resistor 64 and a capacitor 65 connects the emitter of $T_3$ to the base of transistor $T_2$. The function of these cross coupling networks during switching of bistable triggers from one state to another, is well known in the art.

In the assumed initial condition of the switching circuit, the trigger BT was in its ON state and transistor $T_2$ was conducting. The positive shifting pulse which arrives from AND circuit $A_2$ on line 4 starts to turn transistor $T_2$ OFF. As $T_2$ goes OFF, its collector which was close to ground potential, moves toward −12.0 volts which is the voltage available at terminal 61. The base of transistor $T_4$ likewise moves toward −12.0 volts. Since $T_4$ is coupled as an emitter follower, the emitter of $T_4$ will tend to follow the base and it too will move to −12.0 volts. The negative shift at the emitter of $T_4$ is coupled through resistor 62 and capacitor 63 to the base of transistor $T_1$.

The $T_1$ base to emitter junction will become forward biased and $T_1$ will then conduct. As a result of $T_1$ coming into conduction, the collector potential of $T_1$ moves from about −6.0 volts to a ground potential and this is directly applied to the base of transistor $T_3$. $T_3$ is coupled as an emitter follower and the positive shift at its base will be reflected in a positive shift at its emitter. This positive shift is then applied through resistor 64 and capacitor 65 to the base of transistor $T_2$ on line 66 to drive $T_2$ even further toward a non conductive state.

As a result of the positive pulse being applied on line 4, trigger BT has now assumed its OFF state, that is, with transistor $T_1$ conducting.

The potentials available on the trigger output lines 5, 6 and 7 are now just the opposite of what they were under the initial assumed conditions. The voltage on output line 5 has risen from −6.0 volt to ground to condition the input diode 14 of AND circuit $A_1$ and the voltage on output line 6 has dropped from ground to −6.0 volts so that the input to diode 23 of AND circuit $A_2$ is now down. In addition, the voltage on output line 7 from trigger BT has risen from about −6.0 volts to ground, since this line is directly connected to the collector of transistor $T_1$ which moved from −6.0 volts to ground.

The positive shift on line 7 is directed through an emitter follower stage $EF_3$, a special input stage SI, an emitter follower stage $EF_4$ and a relay driver stage RD and causes the energization of relay $R_1$.

Stage $EF_3$ comprises a transistor $T_9$ coupled as an emitter follower to a special input stage SI via line 67. A −12.0 volt potential is supplied from terminal 68 through resistor 69 to the collector of $T_9$ and a +6.0 volts is supplied through resistor 92 from terminal 93 to the emitter of $T_9$. A −12.0 volts is also supplied from a terminal 70 in the SI stage through resistor 71 to the base of transistor $T_{10}$ which is coupled as an emitter follower in stage $EF_4$.

The output of transistor $T_9$ follows the input so that under the assumed initial conditions with the input to $T_9$ on line 7 at −6.0 volts the output from $T_9$ on line 67 through resistor 72 was also about −6.0 volts. The values of resistors 71 and 72 are such that with a −6.0 volts on line 67 and with a −12.0 volts from terminal 70 applied to the special input SI stage, the output of the SI stage on line 75 is about −8.0 volts. A positive shift to ground has just occurred on line 7 to the base of $T_9$, so the output of $T_9$ on line 67 now goes from −6.0 to ground. Since the SI stage now has −12.0 volts from terminal 70 and ground from line 67 applied across it, the output of the SI stage on line 75 will go from −8.0 volts to −5.0 volts, a three volt positive shift.

The output line 76 of stage $EF_4$ also follows the input to the stage since transistor $T_{10}$ is emitter follower coupled. When the three volt positive shift occurs on line 75 a similar three volt positive shift from −8.0 to −5.0 volts will occur on output line 76.

Relay Driver stage RD comprises transistors $T_{11}$ and $T_{12}$, and associated biasing and coupling resistors. A +6.0 volt potential is supplied in the RD stage at terminal 77, a −6.0 volt potential is supplied at terminal 78 and a −12.0 volt potential is supplied at terminal 79.

Under the initial assumed conditions, Transistor $T_{11}$ is not conducting, since it has a −8.0 volts on its base, a −6.0 volts on its emitter and the emitter to base junction is reverse biased. With $T_{11}$ OFF, $T_{12}$ is also off since it has approximately +6.0 volts on its base from terminal 77 and since its emitter is at ground which results in a reverse bias across its emitter to base junction.

As soon as the positive three volt shift occurs on line 76 from −8.0 to −5.0 volts, $T_{11}$ becomes forward biased since its base is at −5.0 volts and since its emitter is at −6.0 volts. As a result, due to the voltage drop across resistors 80 and 81 in the $T_{11}$ collector circuit, the line 82 to the base of transistor $T_{12}$ becomes more negative, transistor $T_{12}$ becomes forward biased, emitter to base, and conducts. A −36.0 volts is provided at terminal 83 and as a result of $T_{12}$ conducting, Relay $R_1$ becomes energized.

The relay points 8, 9 and 10 are thus transferred to their normally open positions. Relay point 8 now supplies reference voltage $RV_2$ which is −6.0 volts to output terminal 2 for application to the oscilloscope "ground" hub 104 instead of the reference voltage $RV_1$ (ground) which was previously applied. Relay point 9 now directs the +6.0 volts from terminal 12 for activating light $L_2$ which indicates that the −6.0 volt reference voltage is now in use. Relay point 10 directs the +6.0 volt source from terminal 12 to the input of $C_1$. The $C_1$ stage is identical to the $C_2$ stage previously described so that a +6.0 volts applied to the $C_1$ input on line 37 will result in a shift from −6 to ground on the output line 38 of $C_1$. This positive shift is applied to transistor $T_{13}$ and since $T_{13}$ is emitter coupled in the same manner as $T_5$ in stage $EF_2$, a ground potential will be directed on the $EF_1$ output line 20 to diode 16 of AND circuit $A_1$.

AND circuit $A_1$ now has ground potentials on input line 5 from trigger BT and on input line 20 from $EF_1$ and is conditioned for a "Transfer to ground" switching operation, if a ground reference voltage is encountered by the oscilloscope probe 109 during subsequent testing.

From the foregoing description, it is apparent that when the −6.0 volt reference voltage is encountered during testing, the resulting negative shifting signal from the oscilloscope 101 will be inverted in the "Transfer to −6.0 volt" channel and will be applied to the trigger BT as a positive shifting signal via line 4. Trigger BT will assume its OFF state, will cause Relay $R_1$ to be energized, and as a result, a −6.0 volt potential will be made available through the normally open relay point 8 and output terminal 2 to the oscilloscope "ground" hub 104. In addition, relay point 9 causes light $L_2$ to turn on to indicate that the −6.0 volt reference level is being applied to the oscilloscope, and relay point 10 provides the necessary switching to condition one input of AND circuit $A_1$ for a transfer back to ground reference level.

The trigger BT in the preferred embodiment of FIG. 1 might require about 1 millisecond to change from one state to another, so the switching time depends largely on the response time of the relay $R_1$. The entire switching operation from one reference potential to another might typically only require 6 or 7 milliseconds, if a conventional high speed relay is employed. It is apparent that the switching circuits provide the new reference potential in a rapid manner when that reference potential has been encountered during testing.

TYPICAL OPERATION—TRANSFER FROM $RV_2$ BACK TO $RV_1$

It may be assumed that the probe 109 has been touched to a circuit test point 108 which is based on ground as a reference level. It is now necessary to transfer from −6.0 volts which is currently in use as a reference to a ground potential so that the observed voltage will be in proper position for observation on the oscilloscope face.

The −6.0 volt to ground change encountered will result in a +12.0 volt differentiated signal from the oscilloscope "Vertical Signal Output" hub 102 being supplied to input terminal 1 of the switching circuit.

The positive signal shift has substantially no effect on the inverting amplifier stage IA so that its output to input diode 22 of AND circuit $A_2$ will remain about −6.0 volts. Since the other inputs of $A_2$ are down anyway, the output on line 4 from $A_2$ will remain unchanged.

The non inverting amplifier NIA does respond to the +12.0 volt incoming signal and the output of transistor $T_6$ tends to follow the input signal in a positive direction. A shift will occur on the line 19 from a −6.0 volts to ground. This is applied to input diode 15 of AND circuit $A_1$. Since all inputs of $A_1$ are now up, the output of $A_1$ will also rise from −6.0 volts to ground.

It will be remembered that when the status of trigger BT was changed on the previous shift from ground to −6.0 volts, the trigger was left in its OFF state and transistor $T_1$ was conducting.

The positive shift from AND circuit $A_1$ is directed via line 3 to the base of transistor $T_1$ through a capacitor 84 and a diode 85. The transistor $T_1$ ceases conduction and the trigger BT is switched to its ON state, with transistor $T_2$ conducting in a manner similar to that previously described. The collector of $T_1$ tends to fall toward −6.0 volts, which is cross coupled as a negative shift to the base of transistor $T_2$ to start it conducting. The collector of $T_2$ becomes more positive, the output of $T_4$ follows this shift and applies it to the base of $T_1$ to drive it even further out of conduction.

The voltages on output lines 5, 6 and 7 of trigger BT now change to their opposite levels. Line 5 goes from ground to −6.0, line 6 goes from −6.0 to ground and line 7 goes from ground to −6.0.

The negative shift on line 7 is directed through $EF_3$, SI and $EF_4$ to turn off Transistors $T_{11}$ and $T_{12}$ in the relay driver stage RD which causes deenergization of the relay $R_1$.

The circuit has now been returned to its initial status. Thus, a −6.0 volt to ground change in reference level encountered during testing has resulted in the application of a positive shifting signal from the oscilloscope terminal 102 through the "Transfer to Ground" channel to the trigger BT via line 3. Trigger BT has assumed its ON state, and has caused relay $R_1$ to be deenergized. As a result ground reference $RV_1$ is available at terminal 2 for application to the oscilloscope "ground" hub 104, indicator light $L_1$ is on through relay point 9, and input 62 of AND circuit $A_2$ is up due to the voltage applied through relay point 10 to stage $C_2$.

As was previously mentioned, any time a change in reference level occurs in the positive or negative direction in a circuit under test, a corresponding positive or negative shift is applied to input terminal 1 of the switching circuit. However, shortly after this first corresponding signal shift occurs at terminal 1, a second signal of similar magnitude but of opposite polarity arrives at terminal 1.

The second shift of opposite polarity is due to the relay point 8 contacting the terminal of the new reference voltage. Thus, on a transfer from —6.0 volts to ground which is positive in direction, the contact of relay point 8 with $RV_1$ terminal 89 will cause a second signal in the negative direction to be applied at terminal 1. Similarly, on a transfer from ground to —6.0 volt which is in the negative direction, the contact of relay point 8 with the $RV_2$ terminal 88 will cause a second signal in the positive direction to be applied to input terminal 1. This occurrence of signals of opposite polarities is due to the fact that a signal encountered by the probe 109 during testing is applied to the grid of the oscilloscope vertical input amplifier while the change in voltage provided to the oscilloscope ground hub 104 affects the potential level at the cathode of the vertical input amplifier. It may be assumed for simplicity that a single input amplifier tube is inverter coupled to succeeding stages in the oscilloscope. When a shift in reference from —6.0 volts to ground is encountered by the probe 109, for example, and is applied to the grid of the input amplifier tube, the tube will immediately conduct, thus, providing a negative shifting signal at its plate. This negative shifting signal may be assumed to be inverted in a succeeding stage and then applied to the "Vertical Signal Output" hub 102 of the oscilloscope as a positive shifting signal representative of the —6.0 volt to ground positive change in reference level.

The switching circuit responds as explained before and provides a ground potential to the oscilloscope "ground" hub 104. As soon as this is applied to the cathode of the vertical input amplifier, the amplifier will cease conduction immediately; its plate will go sharply positive and after the aforementioned inversion, a sharp negative pulse will be directed from the oscilloscope "Vertical Signal Output" hub 102 to the input of the switching circuit.

Since the trigger BT has already changed its state by the time the relay $R_1$ has deenergized, input lines 6, and 26 of AND circuit $A_2$ would be up when the second negative signal arrived from the oscilloscope to bring input line 27 of $A_2$ up through the inverting amplifier IA. If no means were provided to prevent it, the trigger BT would be immediately transferred back to its previous state, and the proper reference voltage would not be available at the output of the switching circuit.

On a transfer to —6.0 volt operation, a negative first signal and a positive second signal arrives from the oscilloscope for reasons similar to those just enumerated. Thus, in the transfer to —6.0 volt operation, AND circuit $A_1$ might be conditioned to provide an output to the trigger BT by the arrival of the second pulse, and the immediate transfer of trigger BT back to its previous state would occur which, similarly, is not desired at this time.

A capacitor 87 is provided in coupling network $C_2$ to keep the $A_2$ input 26 from $C_2$ and $EF_2$ down until some time after the arrival of the second input signal so that no output will be available from $A_2$ and so that trigger BT will remain in the condition established by the first input signal on a transfer to ground operation. A similar capacitor 86 is provided in coupling network $C_1$ so that on a transfer to —6.0 volt operation, the $A_1$ input line 20 from $C_1$ and $EF_1$ will also stay down until some time after the arrival of the second pulse, on a transfer to —6.0 volt operation. Each of the capacitors 86 and 87 has a charging time which extends beyond the time during which a first signal and a second related signal of opposite polarity arrive at terminal 1.

Capacitor 87 prevents line 26 to AND circuit $A_2$ from going to ground by preventing the voltage on line 32 to transistor $T_5$ from assuming an up level until after the second signal of negative polarity which occurs on a transfer to ground operation has ceased. Similarly, capacitor 86 prevents the conditioning of AND circuit $A_1$ until after the second signal of a positive polarity which appears at terminal 1 on a transfer to —6.0 operation has ceased.

The second arriving signal previously discussed is caused by the change in status of relay $R_1$, and the application of the new reference potential to the ground hub of the oscilloscope.

It is possible that other spurious signals or noise having polarities and amplitudes similar to that of the first arriving signal may be forthcoming from the "Vertical Signal Output" hub during the period of time required for transfer from one reference level to another. These undesired signals may be due, for example, to the existence of dirt or other foreign matter at the test point. If this is so, electrical continuity between the oscilloscope probe and the test point may, upon initial contact, be faulty or erratic, which will give rise to this type of signal or noise.

A certain amount of time is required immediately after transfer of the relay point 10 for the previously connected capacitor 86 or 87, to discharge. As previously pointed out, output line 5 from trigger BT is directed to one input of $A_1$ and output line 6 from BT is directed to one input of $A_2$. On any transfer operation, BT changes state in a few microseconds.

A first arriving negative pulse of proper amplitude during a transfer to $RV_2$ (—6.0) operation causes trigger BT to rapidly assume an OFF state. Even though capacitor 87 may not be fully discharged, the immediate lowering of potential on line 6 to $A_2$, prevents $A_2$ from responding to any subsequently arriving pulses of negative polarity. This eliminates any possibility of trigger BT being switched back to its ON state during a transfer to $RV_2$ operation.

Similarly, a first arriving positive pulse of proper amplitude during a transfer to $RV_1$ (ground) operation, causes trigger BT to rapidly assume an ON state. In this case, even though capacitor 86 may not be fully discharged, the immediate lowering of potential on line 5 to $A_1$ prevents $A_1$ from responding to any subsequently arriving pulses of positive polarity. This eliminates any possibility of the trigger BT returning to its OFF state during a transfer to $RV_1$ operation.

As a result of the arrangements just described, the circuit will respond only to a first arriving pulse having the required amplitude. Thereafter both transfer channels are blocked until the expiration of a period of time sufficient to permit the circuits involved to settle down. The previously active channel is blocked by the immediate fall of its associated status line 5 or 6, as the case may be, from trigger BT. The newly selected channel is blocked for a period of time determined by the charging characteristics of its associated capacitor 86 or 87.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An automatic reference switching circuit for selectively providing one of several reference potentials to an oscilloscope which has a test probe, comprising bistable storage means, circuit means for controlling said bistable storage means and further being responsive to signals provided by said oscilloscope which are representative of changes in reference level encountered by said probe during testing, means for conditioning said circuit means to respond only to particular ones of said signals, whereupon said circuit means switches said bistable means into a first state or a second state according to the type of signal provided by said oscilloscope, a plurality of sources of reference potentials, and means under control of said bistable device for providing one of said reference potentials to said oscilloscope when a signal indicative of a change to that reference level has been provided by said oscilloscope.

2. An automatic reference switching circuit for selectively providing one of several reference potentials to an oscilloscope which has a test probe, said oscilloscope providing to said switching circuit a signal corresponding in polarity to the polarity of a change in reference levels encountered by said probe during testing, signal channel circuit means selectively responsive to a first type of signal from said oscilloscope having a first polarity, signal channel means selectively responsive to a second type of signal from said oscilloscope having an opposite polarity to said first type of signal, a bistable device conditioned into a first state under control of said first signal channel means and conditioned into a second state under control of said second signal channel means, a plurality of reference potential sources and means under control of the said bistable device for providing one of said reference potentials to said oscilloscope when the said first type of signal has been provided by said oscilloscope and for providing another of said reference potentials to said oscilloscope when the said second type of signal has been provided by said oscilloscope.

3. An automatic reference switching circuit for supplying a particular one of several reference potentials to an oscilloscope which has a test probe and which provides a signal indicative of a change in reference level encountered by the said probe in a circuit under test, comprising a bistable device, means for selectively switching said bistable device into a first state in response to signals from said oscilloscope which indicate a change in reference potential in a first direction, means for selectively switching said bistable device into a second state in response to signals from said oscilloscope which indicate a change in reference potential in a second direction, a plurality of sources of reference potentials which correspond respectively to the reference potentials utilized in the circuit under test and means responsive to the state of said device for providing one of said reference potentials to said oscilloscope when a signal indicative of a change to that reference level has been provided by the said oscilloscope to said switching circuit.

4. An automatic reference switching circuit for supplying a particular reference potential to an oscilloscope which has a test probe and which provides a signal indicative of a change in reference level encountered by said probe in circuits under test comprising in combination, a bistable device, selectively operable means for switching said bistable device into a first state in response to a signal provided by said oscilloscope which indicates that a change in reference levels has taken place in a positive direction, selectively operable means for switching said bistable device into a second state in response to a signal provided by said oscilloscope which indicates that a change in reference levels has taken place in a negative direction, and means under control of the said device for providing a particular more positive reference potential to said oscilloscope when a signal has been provided by said oscilloscope which indicates a change in a positive direction and for providing a particular more negative reference potential to said oscilloscope when said oscilloscope has provided a signal to said circuit which indicates a change in a negative direction.

5. A switching circuit for automatically providing a first reference potential to an oscilloscope in response to a signal from said oscilloscope which has a first polarity indicating that a change to said reference potential has been encountered in a circuit under test and for providing a second reference potential to said oscilloscope in response to a signal from said oscilloscope which has a second polarity indicating that a change to said second reference potential has been encountered in a circuit under test, comprising first signal channel means responsive to signals from said oscilloscope of said first polarity and which provide an output signal of corresponding polarity, second signal channel means responsive to signals from said oscilloscope of said second polarity and which provide an inverted output signal corresponding in polarity to said first signal, bistable storage means which changes from one state to another only in response to signals of said first polarity, a first reference potential source and a second reference potential source, switching means conditioned under control of said bistable storage means into a first state when said storage means has assumed its first state and into a second state when said storage means has assumed its second state, a first AND circuit conditioned to provide an output signal of said first polarity by said bistable storage means when said storage means is in its second state and by said switching means when said switching means is in its second state, and further conditioned by said first signal channel means when a signal of said first polarity has been received from said oscilloscope, the output of said first AND circuit being directed to said bistable storage means to change said storage means to its first state, whereby the said switching means assumes its first state and provides the said first reference potential to the said oscilloscope, a second AND circuit conditioned to provide an output signal of said first polarity by said bistable storage means when said storage means is in its first state, and by the said switching means when said means is in its first state, and further conditioned by the said second channel, when a signal of said second polarity has been received from said oscilloscope, the output of said AND circuit being directed to said bistable storage means to change said storage means to its second state, whereby the said switching means assumes its second state and provides said second reference potential to said oscilloscope.

6. An automatic reference switching circuit for providing a particular reference potential to an oscilloscope which has a test probe, and which provides A.-C. signals having primary signal components which correspond in polarity to the polarity of a change in reference level encountered by the said probe during testing and also having spurious signal components, comprising bistable means, circuit means for switching said bistable means into a first state in response to a primary signal component having a first polarity, circuit means for switching said bistable device into a second state in response to a primary signal component having a second polarity, a plurality of reference potential sources, means under control of the said bistable means for providing a reference potential corresponding to the reference potential encountered by said probe as indicated by a said primary signal component and circuit means for preventing a response by the said switching circuit to the spurious signal components associated with either of said types of primary signal components.

References Cited in the file of this patent
UNITED STATES PATENTS

| 2,644,037 | Beaufoy | June 30, 1953 |
| 2,706,811 | Steele | Apr. 19, 1955 |
| 2,807,716 | Steele | Sept. 24, 1957 |
| 2,880,317 | Vaughan | Mar. 31, 1959 |